Figure 14:
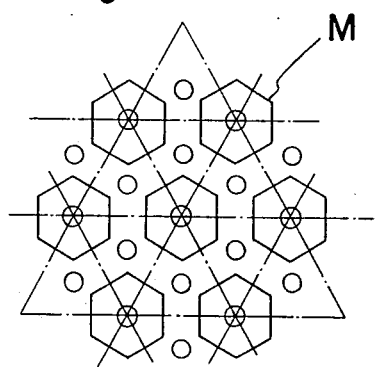

United States Patent [19]

Kimura et al.

[11] Patent Number: 4,697,878
[45] Date of Patent: Oct. 6, 1987

[54] BI-LEVEL FOCUSING PLATE OF PHASE GRATING TYPE

[75] Inventors: Kazuo Kimura; Tetsuyuki Tanimoto, both Sakai; Hiroshi Kobayashi, Osaka, all of Japan

[73] Assignee: Minolta Camera Kabushiki Kaisha, Osaka, Japan

[21] Appl. No.: 706,962

[22] Filed: Feb. 28, 1985

[30] Foreign Application Priority Data

Mar. 1, 1984 [JP] Japan .................................. 59-39887

[51] Int. Cl.$^4$ .......................... G02B 5/18; G03B 13/24
[52] U.S. Cl. .............................. 350/162.11; 350/162.2; 354/200
[58] Field of Search ...................... 350/162.11, 162.16, 350/162.17, 162.19, 162.2; 354/200

[56] References Cited

U.S. PATENT DOCUMENTS

| 3,547,546 | 5/1966 | Schier . | |
|---|---|---|---|
| 4,083,627 | 4/1978 | Okano | 350/162.2 |
| 4,598,977 | 7/1986 | Kobayashi . | |

FOREIGN PATENT DOCUMENTS

| 2134943 | 1/1972 | Fed. Rep. of Germany ... 350/162.2 |
|---|---|---|
| 2946005 | 11/1979 | Fed. Rep. of Germany . |
| 55-9568 | 7/1978 | Japan . |
| 55-70827 | 11/1978 | Japan . |
| 55-111931 | 2/1979 | Japan . |
| 53-31127 | 5/1980 | Japan . |
| 57-41621 | 8/1980 | Japan . |

*Primary Examiner*—John K. Corbin
*Assistant Examiner*—D. Edmondson
*Attorney, Agent, or Firm*—Price, Gess & Ubell

[57] ABSTRACT

There is disclosed a bi-level focusing plate of phase grating type in which micro unit patterns, each of which is comprised of one or more projections and one or more recessions, are arranged regularly and repeatedly at a pitch of 10 to 30 μm. The phase difference between each of projections and each of recessions is set at $\pi$ radian against a light having a wavelength of 400 to 700 nm and the ratio in area of total area of projections or recessions in one unit pattern to the area of said one unit pattern is set so as to fall into a range of 0.3 to 0.5. The focusing plate is characterized in that the boundaries in each unit pattern each defined between the projection and the recession adjacent to each other therein are comprised of straight-lined portions and curved portions.

20 Claims, 17 Drawing Figures

(a)  (b)  (c)

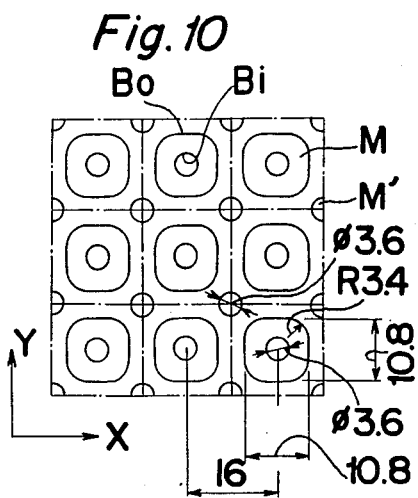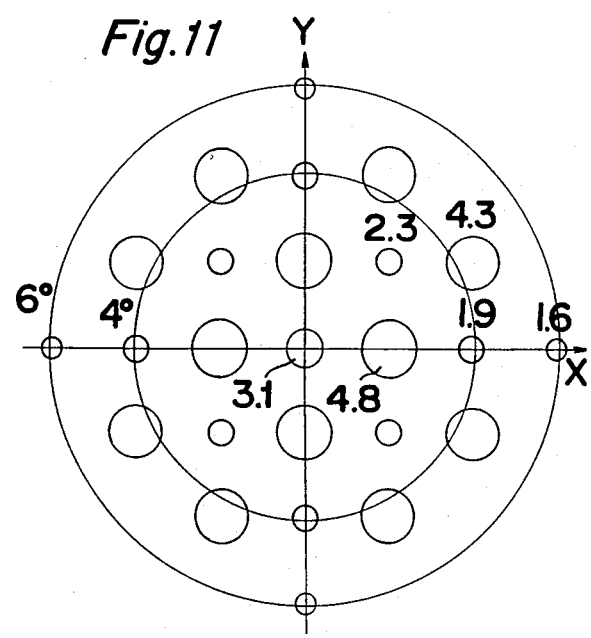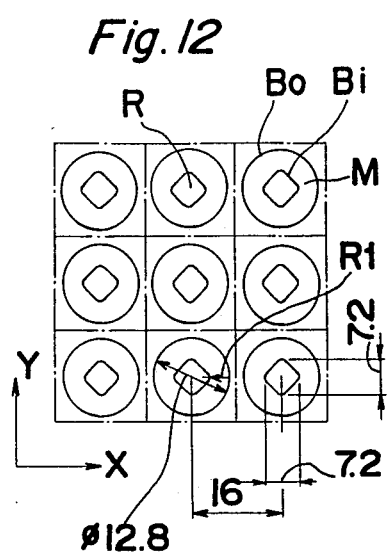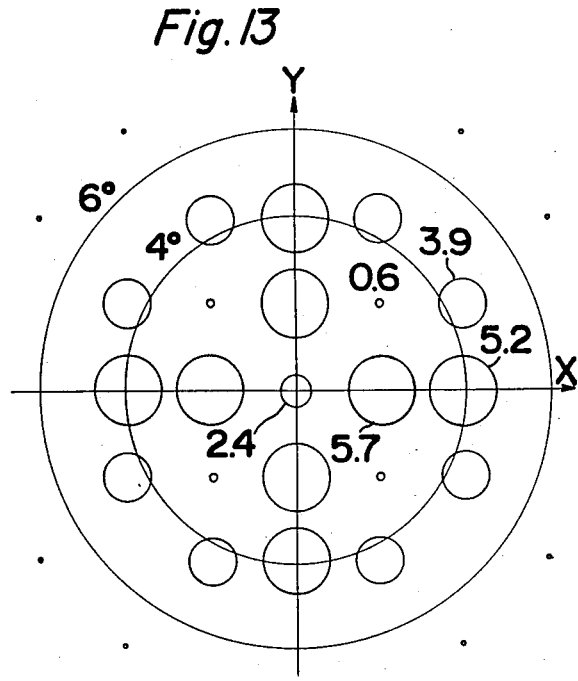

BI-LEVEL FOCUSING PLATE OF PHASE GRATING TYPE

FIELD OF THE INVENTION

The present invention relates to a bi-level focusing plate of a phase grating type in which micro unit patterns, each of which is comprised of projections and recessions, are arranged regularly in a rectangular or triangular lattice.

BACKGROUND OF THE INVENTION

There has been known a diffraction lattice of a phase grating type being comprised of many micro unit patterns which are arranged regularly in a rectangular or triangular lattice and repeatedly at a pitch of 10 to 30 μm, each of the unit patterns being comprised of one or more projections and one or more recessions which are so formed as to have a predetermined phase difference therebetween against a light having a desirable wave length ranging from 400 to 700 nm and each of the projections or recessions being formed into a circle, a ring or a combination thereof.

A diffraction lattice of this type is especially suitable for a focusing plate for detecting a focusing state of a focusing lens assembly, since the diffracted light of zero order can be controlled in strength thereof, and at the same time, the diffraction or scattering character of the lattice can be controlled (see, for instance, JP-A No. 11931/1980 or No. 41621/1982).

Generally speaking, features required for a focusing plate of an optical system are as follows;

(A) The image projected thereon can be observed brightly and clearly, (B) When the image projected thereon is in a defocus condition, such image can be observed in a naturally blurred state.

(C) When the focusing plate is used in a view finder, it should not be observed as coarse by grained representation.

In order to satisfy these features A, B and C favorable for a focusing plate, the diffraction lattice of the phase grating type should have characteristics as follows;

(a) In order to satisfy the feature A, almost of all the diffracted light should be included within a maximum angle which is determined according to the F-number of the focusing lens assembly. In other words, almost of all the light having been passed through the lens assembly can be observed on the focusing plate.

(b) In order to satisfy the feature B, the image appearing on the focusing plate is made blurred as a whole and uniformly in a defocus condition by heightening the maximum order of the diffracted light to be included within the maximum angle as high as possible and by equalizing each of intensities of diffracted light of respective orders as far as possible. Conversely, it is impossible to obtain the image blurred naturally as mentioned above in the case wherein the diffracted light of specific orders having intensities stronger than those of others are enhanced.

(c) The coarse grained image as mentioned in the item (C) is directed to such images as observed when frosted glass is used for a focusing plate. As for a bi-level focusing plate of a phase grating type, each of the unit patterns formed thereon is observed as a grained image, when the pitch thereof is increased to a degree of the resolving power of the human eye. Accordingly, it is important to make the size or the pitch of the unit pattern as small as possible in order to eliminate such grained images. In this respect, these are observed wherein the pitch of the unit pattern exceeds 30 μm in the case of view finder installed in an ordinary single lens reflex camera. Also, each of the unit patterns will be observed as a grained image in the view finder of a video camera unless the repeated pitch is set smaller than 20 μm, since the video camera has a magnification higher than that of the single lens reflex camera.

Although it is desirable to make the size of the unit patterns as small as possible in order to avoid the grained image of the focusing plate, this makes the manufacturing thereof extremely difficult.

As is disclosed in the Japanese references cited above, it is necessary, in order to satisfy the characteristic (b), to make the diffusion or diffraction pattern flat by making the configuration of projections or recessions in each of the unit patterns complicated and/or miniatured as far as possible.

Figure 1:
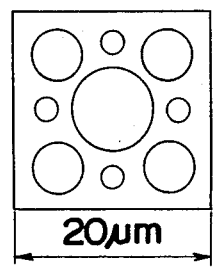

FIG. 1 shows a unit pattern of a square configuration as is disclosed in JP-A No. 41621/1982. The unit has one circular projection of a large radius disposed at the center thereof, four circular projections of a medium radius disposed at each corner thereof and four circular projections of a small size disposed between adjacent two projections. If unit patterns are designed so as to have a pitch of 20 μm, the diameter of the small circular projection will be of an order of 2.4 μm and the minimum distance among these projections will be of an order of 1.6 μm. As is known to those skilled in the art, the method applicable for forming these micro unit patterns is a photo-etching as is used for forming a pattern of an integrated circuit of a semiconductor. Even if the photo-etching method is employed, it becomes considerably difficult to form such complicated unit patterns with such a narrow distance as mentioned above. This causes the cost for manufacturing the focusing plate to increase to an unprofitable level.

SUMMARY OF THE INVENTION

The present invention has an essential object to provide a bi-level focusing plate of a phase grating type being capable of satisfying all of the features desired for the focusing plate without making individual unit patterns thereof complicated and/or miniaturized.

According to the present invention, there is provided a bi-level focusing plate of a phase grating type in which micro unit patterns, each of which is comprised of one or more projections and one or more recessions, are arranged regularly and repeatedly at a pitch of 10 to 30 μm. The phase difference between each of the projections and each of the recessions is set at $\pi$ radian against a light having a wavelength ranging from 400 to 700 nm, while the ratio in area of the total area of projections or recessions in one unit pattern to the area of one unit pattern is set so as to fall into a range of 0.3 to 0.5. The boundaries in each unit pattern between the projection and the recession adjacent to each other therein are comprised of straight-lined portions and curved portions.

The diffraction pattern of a circular aperture is represented by a Bessel-function and that of a rectangular aperture is represented by a sinc-function. Also, the diffraction pattern of a rectangular aperture shows an unisotropy in which the pattern appearing in a direction along the side of the rectangular aperture is different from that in a direction diagonal, while, on the other hand, the diffraction pattern of the circular aperture is independent on the direction thereof namely, isotopic.

According to the present invention wherein boundaries defined between respective projections and recessions are comprised of straight-lined portions and curved portions, it becomes possible to obtain a uniform diffraction pattern without making unit patterns of the focusing plate complicated and/or miniaturized since the diffraction pattern due to the straight lined portions and that due to the curved portions are overlapped with each other.

In the bi-level focusing plate of the phase grating type according to the present invention, the repeating pitch of the unit pattern is given a value falling into a range of 10 to 30 μm. If it is chosen to be a value smaller than 10 μm, the size of the unit pattern itself becomes too small and this results in disadvantages in the cost and manufacturing thereof as mentioned above. If it is chosen to be a value greater than 30 μm, the grained image due to the unit pattern will be enhanced undesirably.

The phase difference between each projection and each recession is set at $\pi$ radian against a light having a wavelength which falls into a range between 400 to 700 nm, for example 550 nm.

Now, the phase difference between the projection and the recession is given by an equation as follows;

$$\theta = \frac{2\pi}{\lambda}(n-1)dp$$

wherein dp is the difference in height between the projection and recession, $\lambda$ is the wavelength of the light, and n is the index of refraction of the transparent material forming the focusing plate.

According to the equation, the phase difference $\theta$ is given as 1.787 dp $\pi$ (radian) in the case where dp is measured in the units of nm and in the case where $\lambda$ is equal to 550 nm and n is equal to 1.4914 (acrylic resin) and, therefore, if dp is equal to 0.56 μm, $\theta$ is equal to $\pi$ radian. In this case, since the light having passed through the projection has the phase reversed to that of the light having passed through the recession, these lights are cancelled with each other. Therefore, the diffracted light of zero order will not appeared at all, since the quantities of the lights having passed through the projection and the recession become equal to each other if the total area of all projections belonging to one unit pattern is set equal to that of all recessions belonging to one unit pattern.

Although the diffracted light of zero order is completely cancelled in the case that n=1.4914, $\lambda$=550 nm and dp=0.56 μm as mentioned above, the diffracted light of zero order will remained if at least one of these physical quantities is varied from the value recited above. For instance, in the case that $\lambda$=400 nm, the phase difference becomes 1.376 $\pi$ radian exceeding the reversed phase and, therefore, a little diffracted light of zero order will remain. Moreover, the diffracted lights of other orders will be changed in intensity and in diffraction angle (in direction and in position) and become separated like a rainbow when compared with the case of $\lambda$=550 nm. In the case of $\lambda$=700 nm, phenomena similar to those just mentioned above observed, except that the diffraction angle is shifted outwards contrary to the case of $\lambda$=400 nm.

In order to use a diffraction lattice of this type as a focusing plate for the view-finder, it is desirable to design the diffraction lattice so as to obtain the best mode thereof at the center area of the visible light range, since the object has white light usually. If the phase difference $\theta$ is set equal to $\pi$ radian at a wavelength shorter than 400 nm and, accordingly, dp is set to a value smaller than 0.41 μm, the phase difference obtained at $\lambda$=700 nm is smaller than 0.57 $\pi$ radian. Thus, the diffracted light of zero order is enhanced extremely to invite an undesirable blur and inferior focusing faculty. If the phase difference $\theta$ is set equal to $\pi$ radian at a wavelength longer than 700 nm contrary to the above, the situation similar to the above case will be obtained.

Next, the dependency of the intensity of the diffracted light of zero order with respect to areas of projections and recessions will be considered.

As is well known to those skilled in the art, the intensity of the diffracted light of zero order is given by an equation;

$$I(0,0) = S_U^2 + S_L^2 + 2S_U S_L \cos\theta$$

wherein Su is a ratio of the area occupied by all projections belonging to one unit pattern to the whole area of the unit pattern, $S_L$ is a ratio of the area occupied by all recessions belonging to one unit pattern to the whole area of the unit pattern, and $\theta$ is the phase difference.

According to the equation, if $\theta=\pi$ (radian), the relation is obtained as follows.

$$I(0,0) = (S_U - S_L)^2$$

Therefore, if Su=$S_L$, the intensity I(0,0) is equal to zero.

Also, if Su=0.3 and $S_L$=0.7 or if Su=0.7 and $S_L$=0.3, I(0,0) is equal to 0.16. Namely, in the case that the ratio in area of projections or recessions to the total area of the unit pattern is decreased to an order of 0.3, 16% of the total amount of the diffracted light is concentrated into the diffraction pattern of zero order. If the concentration of light into zero order exceeds 16%, it becomes impossible to obtain a natural blur in a defocused condition and, therefore, it becomes difficult to distinguish the focused state from the defocused state. As for the diffracted light of zero order, the same results will be obtained even if the projections are replaced by recessions and vice versa. Results similar to those just mentioned above will be obtained with respect to the diffracted lights of other orders.

DESCRIPTION OF THE ACCOMPANYING DRAWINGS

Figure 15:
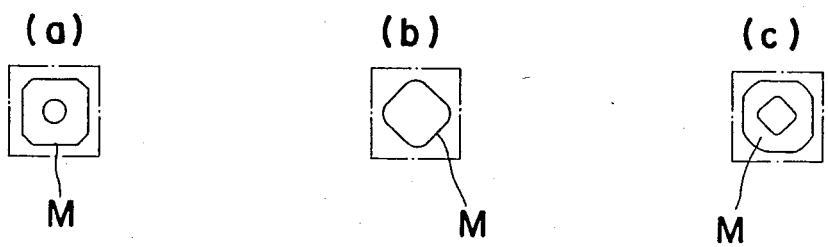
Figure 2:
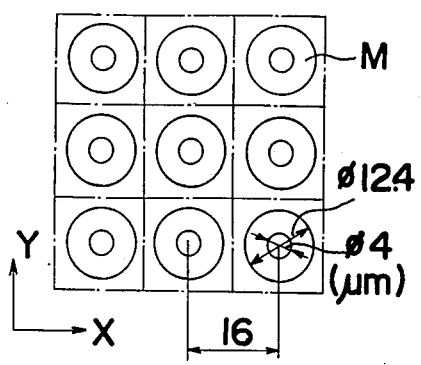
Figure 3:
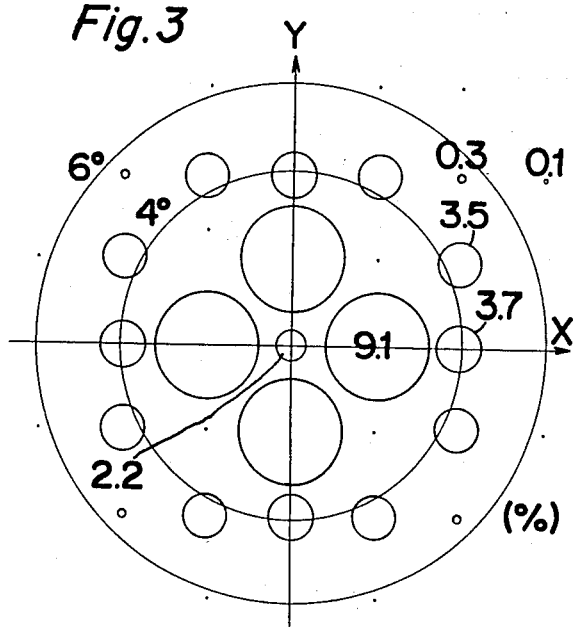
Figure 4:
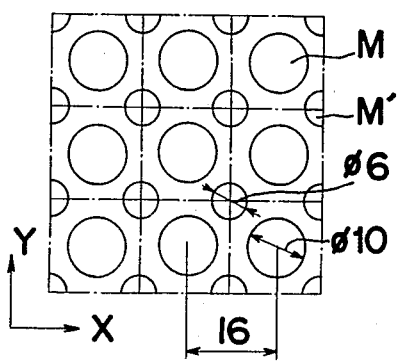
Figure 5:
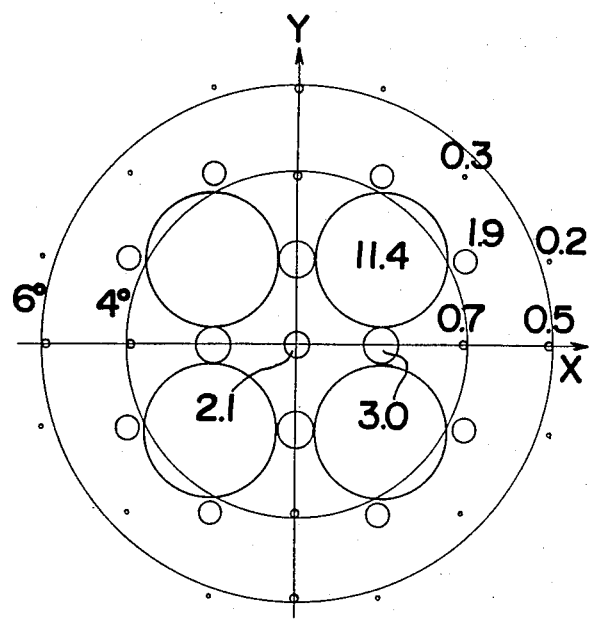
Figure 6:
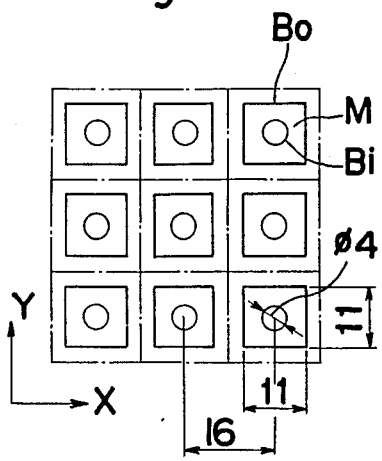
Figure 7:
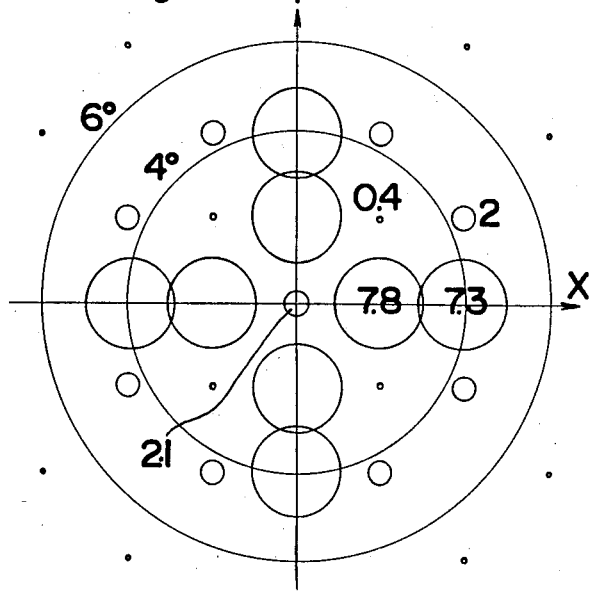
Figure 8:
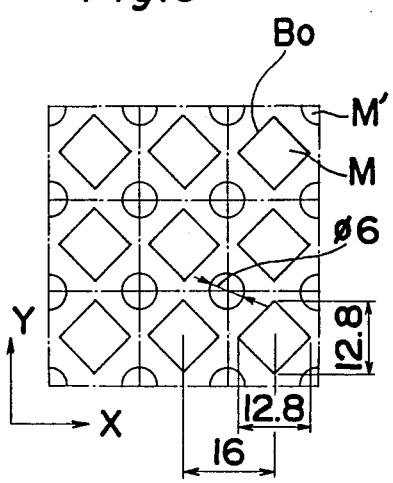
Figure 9:
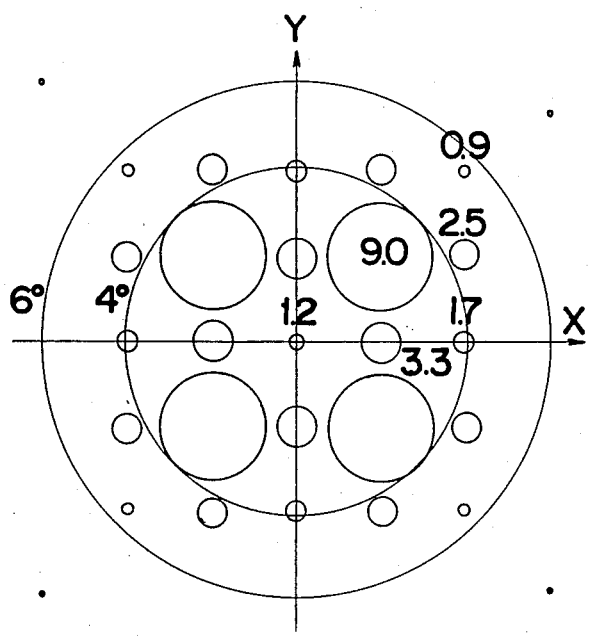

The present invention will now described more in detail by way of examples and with reference to the accompanying drawings, in which;

FIG. 1 is an enlarged plan view showing a single unit pattern of a conventional bi-level focusing plate of phase grating type, FIG. 2 is an enlarged partial plan view showing a bi-level focusing plate as modified in dimension from a conventional focusing plate shown in FIGS. 19 and 20 of DE-OS (German Offenlegungsschrift) No. 2946005, FIG. 3 is a diffraction pattern obtained by the unit pattern shown in FIG. 2, FIG. 4 is an enlarged partial plan view showing another bi-level focusing plate as modified in arrangement and dimension from a conventional focusing plate shown in FIG. 3 of U.S. Pat. No. 4,598,977 corresponding to JP-A No. 41621/1982, FIG. 5 is a diffraction pattern obtained by the unit pattern shown in FIG. 4, FIG. 6 is an enlarged partial plan view showing a focusing plate according to the first embodiment of the present invention, FIG. 7 is a diffraction pattern obtained by the unit pattern of the first embodiment, FIG. 8 is an enlarged partial plan view showing a focusing plate according to the second embodiment of the present invention, FIG. 9 is a diffraction pattern obtained by the unit pattern of the second embodiment, FIG. 10 is an enlarged partial plan view showing a focusing plate according to the third embodiment of the present invention, FIG. 11 is a diffraction pattern obtained by the unit pattern of the third embodiment, FIG. 12 is an enlarged partial plan view showing a focusing plate according to the fourth embodiment of the present invention, FIG. 13 is a diffraction pattern obtained by the unit pattern of the fourth embodiment, FIG. 14 is an enlarged partial plan view of a focusing plate according to other embodiment having a regular triangular arrangement, FIGS. 15(a), 15(b) and 15(c) are plan views respectively showing other unit patterns according to the present invention.

Each of diffraction patterns shown in FIGS. 3, 5, 7, 9, 11 and 13 is obtained under the conditions that the wavelength of the light is equal to 550 nm, the index n of the material of the plate is equal to 1.4914 and the difference dp in height between a projection and recession is equal to 0.56 $\mu$m.

COMPARISON

In order to make an understanding of the present invention easier, a bi-level focusing plate of a phase grating type having relatively simple unit patterns will be considered prior to the description of the embodiments according to the present invention.

EXAMPLE 1 FOR COMPARISON

FIG. 2 shows an arrangement of unit patterns according to the Example 1, and FIG. 3 shows the diffraction pattern of one point light source obtained through the single unit pattern which is defined as a square enclosed by two adjacent longitudinal chain-lines and two adjacent transversal chain-lines in FIG. 2.

As shown in FIG. 2, the micro unit patterns are arranged in a square lattice at a repeated pitch of 16 $\mu$m. Each unit pattern has a single ring-like projection M having the diameter of the outer circle of 12.4 $\mu$m and that of the inner circle of 4 $\mu$m. The portion of the unit pattern other than the projection M is formed as a recession. In the unit pattern of the Example 1, the ratio in area of the projection M to the total area of the unit pattern is about 0.43.

According to Example 1, since the narrowest distance between the two adjacent projections is a relatively large value of 3.6 $\mu$m, the manufacturing thereof is easy.

However, it becomes impossible to obtain a natural blur in a defocused condition, since the intensity of the diffracted light of a first order, namely an order of ($\pm$1,0), (0,$\pm$1), becomes 9.1% which is extremely large when compared with the diffracted light of higher orders, as is shown in FIG. 3. In FIG. 3, each circle indicates the diffracted light of a respective order and the radius thereof is chosen so as to be proportional to the intensity of the corresponding diffracted light. Moreover, each of intensities thereof is indicated in unit of percentage, in case of need, in FIG. 3. The circles indicated by 4°, 6° in FIG. 3 correspond to the diffraction angles of 4° and, 6° respectively. The manner of indications just mentioned about FIG. 3 will be used commonly through all of the figures showing a diffraction pattern.

EXAMPLE 2 FOR COMPARISON

In the Example 2, each of the micro unit patterns has one circular projection M of a relatively large radius disposed at the center thereof and four projections M' disposed at four corners thereof respectively, each of which is formed as a quarter circle of a relatively small radius. The pitch is set equal to 16 $\mu$m and diameters of the larger and small circles are set equal to 10 $\mu$m, 6 $\mu$m respectively. The ratio in area of all projections M, M' to the unit pattern is about 0.43.

In the Example 2, the minimum distance between the large and small projections is about 3.3 $\mu$m. Accordingly, there is no difficulty in the manufacturing thereof. However, only the intensity of the diffracted light of first order in the diagonal direction, namely each of I($\pm$1,1) and I(1,$\pm$1), is enhanced extremely up to about 11.4%. According to such a diffraction pattern as shown in FIG. 5, there is no possibility in obtaining a desirable natural blur in a defocused condition.

As is clear from these considerations about Examples 1 and 2, it is understood that a desirable natural blur can not be obtained, since only the diffracted light of a specific order is enhanced when employed to such a simple pattern as is known conventionally.

EMBODIMENTS OF THE PRESENT INVENTION

First Embodiment

In the embodiment, as is shown in FIG. 6, each of unit patterns has a single projection M. The outer boundary Bo of the projection is formed as a square and the inner boundary Bi thereof is formed as a circle of a relatively small radius.

FIG. 7 shows a diffraction pattern of a point light source obtained in the case that the pitch is set equal to 16 $\mu$m, the length of the side of the regular rectangle is set equal to 11 $\mu$m and the diameter of the small circle is set equal to 4 $\mu$m (the resulted minimum distance between the adjacent two projections is 5 $\mu$m). In this case, the ratio in area of the projection is about 43%.

As is clear from the comparison of the diffraction pattern shown in FIG. 7 with that shown in FIG. 3, the diffraction pattern obtained in the first embodiment of the invention is much improved in that each light intensity of a first order, I($\pm$1,0), I(0,$\pm$1) (=7.8%) is decreased so as to be almost equal to that of a second order namely I($\pm$2,0), I(0,$\pm$2) (=7.3%). This means that the scattering characteristic of the diffracted light can be improved by forming the outer boundary Bo of the projection M with straight lines.

Second Embodiment

The second embodiment is shown in FIG. 8. As is clear from a comparison with the Example 2 shown in FIG. 4, the central circular projection M of Example 2 is replaced by a central projection M of a regular rectangle in this embodiment.

FIG. 9 shows the diffraction pattern of a point light source in the case where the repeating pitch, the length of the side of the regular triangular projection M and the diameter of the small circular projection M' are respectively set equal to 16 μm, 9 μm and 6 μm in the second embodiment. The resulting minimum distance is 3.2 μm and the ratio in area of projections M, M' to the unit pattern is about 0.44.

Comparing the diffraction pattern of FIG. 9 with that of FIG. 5, it can be recognized that the directional dependency of the former is improved so as to be flattened when compared with that of the latter, since intensities I(±1,0), I(0,±1), I(±2,0), I(0,±2), I(±2,±1), I(±1,±2) are increased respectively, although intensities I(±1,1) and I(1,±1) are still kept high.

According to the first and second embodiments of the present invention, it can be understood that the diffraction pattern can be flattened, without making the unit pattern complicated, by combining straight-lined boundaries and circular boundaries each of which is defined between a projection and a recession adjacent to each other.

Third Embodiment

The unit pattern shown in FIG. 10 has a central projection M which is formed by rounding every corner of the square projection as is shown in FIG. 6. Therefore, the outer boundary Bo of the central projection M is comprised of arc portions and straight lined portions and is combined so as to continue one after another. This unit pattern is obtained as the result of combining the unit pattern shown in FIG. 6 with the unit pattern shown in FIG. 8.

FIG. 11 shows the diffraction pattern of a point light source which is obtained in the case where the repeated pitch is set equal to 16 μm, the length of the side of the square, assumed that every corner thereof is not rounded, is set equal to 10.8 μm, the radius of the curvature of each arc portion is set equal to 3.4 μm, the diameter of the inner circle is set equal to 3.6 μm and the diameter of the small circular projection M' is set equal to 3.6 μm. The area occupied by all of projections M, M' on one unit pattern is about 0.44 of the whole area of the unit pattern.

The diffraction pattern shown in FIG. 11 is improved much more in flatness even when compared with those shown in FIG. 7 and FIG. 9. Namely, in the diffraction pattern according to the present embodiment whereas the intensities I(±1,0), I(0,±1) are decreased to 4.8%, the intensities I(±2,±1), I(±1,±2) are enhanced up to 4.3% and, moreover, I(±1,±1), I(±2,0), I(0,±2), I(±3,0) and I(0,±3) have respectively a value not negligible.

Since the diffracted light is scattered uniformly in the radial direction according to these features mentioned above, a natural blur in a defocused condition can be obtained.

Moreover, it is to be noted that the amount of the diffracted light when integrated within the range defined by the diffraction angle of 6° is about 80% of the total amount thereof. This leads to a bright focusing plate sufficient for the focusing plate of a view finder. Further, from the viewpoint of making such unit patterns, rounding corners, according to the present embodiment, provides an advantage in that unit patterns are made easier than those shown in FIG. 6 and/or in FIG. 8, since it is difficult to form corners of a right angle exactly in such a micro unit pattern.

Fourth Embodiment

The unit pattern shown in FIG. 12 has only one projection M at the center thereof. The outer boundary Bo thereof is defined by a circle of a relatively large radius. At the center portion thereof, there is formed a recession R of a substantially square configuration. Every corner of the recession is chamfered to form a rounded corner as shown in FIG. 11. Accordingly, the inner boundary Bi defined between the projection M and the recession R has curved portions together with straight lined portions. It is to be noted that the recession R is so formed as for the diagonals of the recession R to coincide with the directions along which the unit patterns are arranged.

The unit pattern according to this embodiment has an advantage in that it is favorable for manufacturing since every corner of the recession R is chamfered and in that the minimum width of the projection M defined by the outer boundary Bo and every corner portion of the inner boundary Bi can be kept relatively wide.

FIG. 13 shows the diffraction pattern of a point light source obtained in the case where the repeating pitch is 16 μm, the diameter of the outer circle is 12.8 μm, the length of the diagonal of the recession R being obtained with the roundness of the corner of the recession R ignored is 7.2 μm and the minimum width of the projection M is 3.2 μm. In this case, the ratio of area of projection M to that of the unit pattern is 0.42.

In the diffraction pattern shown in FIG. 11, the diffracted light of order of (±2,0), (0,±2) is enhanced next to the diffracted light of order of (±1,0), (0,±1) and, next to those, the diffracted light of order of (±2,±1), (±1,±2) is enhanced.

Accordingly, a natural blur can be obtained in a defocused condition.

Although only the square arrangement is considered in the embodiments mentioned above; other arrangement, for instance an equilateral triangle arrangements, can be employed in the present invention.

FIG. 14 shows an example of an equilateral triangle arrangement wherein the configuration of the unit pattern is changed into a hexagon in place of a square so as to fit thereto.

According to the equilateral triangle arrangement, a point image can be blurred more naturally and circularly than the case of the square arrangement. However, in the former, line images in the longitudinal and transversal directions are blurred in their respective manners different from each other.

It is also possible to replace a circle with an oval or a square with a rectangle or a rhombus. However, in such a case, an unisotropy in the direction is introduced in the diffraction pattern.

Unit patterns shown in FIGS. 15(a), 15(b) and 15(c) are developed from the patterns shown in FIGS. 6, 8 and 12 respectively. Therefore, the diffraction patterns obtained by the former unit patterns are similar to those of the latter.

In the unit pattern shown in FIG. 15(a), the projection M of a substantial square configuration is chamfered at every corner of the square.

In the unit pattern shown in FIG. 15(b), the projection M of a rectangle is rounded at every corner thereof.

In the unit pattern shown in FIG. 15(c), the projection M has an outer boundary Bo which is obtained when the circular outer boundary Bo of the projection shown in FIG. 12 is cut off arc-like at every portion where the distance between the adjacent projections is narrowed. The outer boundary Bo seems appear in configuration like an octagon.

A octagon and other regular polygons of higher order or the like show diffraction patterns substantially the same to that of a circle. Therefore, as far as this specification, boundaries defined by those polygons or the like mentioned above are deemed equivalent to curved portions.

Although the present invention has been fully described with reference to the preferred embodiments, many modifications and variations thereof will now be apparent to those skilled in the art, and the scope of the present invention is therefore to be limited not by the details of the preferred embodiment described above, but only by the terms of the appended claims.

What is claimed is:

1. In a bi-level focusing plate of a phase grating type having a substrate with a surface on which micro unit patterns, each of which comprises one or more projections or one or more recessions defined relative to the surface of the substrate, are arranged regularly and repeatedly at a pitch of 10 to 30 μm, such that the phase difference between each of the projections and or recessions and the surface of the substrate is set at $\pi$ radian against a light having a wavelength of 400 to 700 nm and such that the ratio in area of total area of the projections or recessions in one unit pattern to the area of said one unit pattern is set so as to fall into a range of 0.3 to 0.5, the improvement wherein the margins of the projections or recessions in each unit pattern comprise straight-lined portions and curved portions, and each of the unit patterns has a single projection being formed so as to have outer and inner margins respectively defined to the outer and inner portions of the surface of the substrate adjacent thereto.

2. The improvement according to claim 1, wherein the configuration of the outer margin of said single projection is substantially a square and the configuration of the inner margin thereof is substantialy a circle.

3. The improvement according to claim 2, wherein the single projection is chamfered at each of the outer margins thereof.

4. The improvement according to claim 3, wherein the configuration of each of the unit patterns is a square and the unit patterns are arranged regularly and repeatedly at said pitch in a square lattice.

5. The improvment according to claim 2, wherein the configuration of each of the unit patterns is a square and the unit patterns are arranged regularly and repeatedly at said pitch in a square lattice.

6. The improvement according to claim 1, wherein the configuration of the outer margin of said single projection is substantially a circle and the configuration of the inner margin thereof is substantially a square.

7. The improvement according to claim 6, wherein the configuration of each of the unit patterns is a square and the unit patterns are arranged regularly and repeatedly at said pitch in a square lattice.

8. The improvement according to claim 1, wherein the configurations of the outer and inner margins are squares respectively and at least one of them is rounded off at each corner thereof.

9. The improvement according to claim 8, wherein the configuration of each of the unit patterns is a square and the unit patterns are arranged regularly and repeatedly at said pitch in a square lattice.

10. The improvement according to claim 1, wherein the configuration of each of the unit patterns is a square and the unit patterns are arranged regularly and repeatedly at said pitch in a square lattice.

11. In a bi-level focusing plate of a phase grating type having a substrate, on a surface of which micro unit patterns, each of which comprises one or more projections or one or more recessions defined relative to the surface of the substrate, are arranged regularly and repeatedly at a pitch of 10 to 30 μm, such that the phase difference between each of the projections or each of the recessions and the surface of the substrate is set at $\pi$ radian against a light having a wavelength of 400 to 700 nm and such that the ratio in area of total area of the projections or recessions in one unit pattern to the area of said one unit pattern is set so as to fall into a range of 0.3 to 0.5, the improvement wherein the margins of the projections or recessions in each unit pattern comprises straight-lined portions and curved portions, each of the unit patterns has a plurality of projections each of which has at least an outer margin defined relative to a portion of the surface of the substrate adjacent thereto, and the outer margin of one of the projections is configured into a square whereas the outer margin of each of the rest of the projections is configured into a circle.

12. The improvement according to claim 11, wherein said one projection is so formed as to have an inner margin defined to a recession which is encircled thereby.

13. The improvement according to claim 12, wherein said one projection is rounded off at each corner of the outer margin thereof.

14. The improvement according to claim 13, wherein the configuration of each of the unit patterns are arranged regularly and repeatedly at said pitch in a square lattice.

15. The improvement according to claim 12, wherein the configuration of each of the unit patterns are arranged regularly and repeatedly at said pitch in a square lattice.

16. The improvement according to claim 11, wherein the configuration of each of the unit patterns are arranged regularly and repeatedly at said pitch in a square lattice.

17. In a bi-level focusing plate of a phase grating type having a substrate, on a surface of which micro unit patterns of an equi-hexagon, each of which comprises one or more projections or one or more recessions defined relative to the surface of the substrate, are arranged regularly and repeatedly in a lattice at a pitch of 10 to 30 μm, such that the phase difference between each of the projections or recessions and the surface of the substrate is set at $\pi$ radian against a light having a wavelength of 400 to 700 nm and such that the ratio in area of total area of projections or recessions in one unit pattern to the area of said one unit pattern is set so as to fall into a range of 0.3 to 0.5, the improvement wherein the margin in each unit pattern each defined between the projection or the recession and a portion of the surface of the substrate adjacent to each other therein comprises straight-lined portions and curved portions, and each of the unit patterns has a single projection being formed so as to have a hexagonal outer margin and a circular inner margin respectively defined to the outer and inner recessions adjacent thereto.

18. The improvement according to claim 17, wherein said one projection is rounded off at each corner of the outer boundary thereof.

19. In a bi-level focusing plate of a phase grating type in which micro unit patterns are formed of an equi-hexagon configuration, each of which is comprised of one or more projections and one or more recessions, the patterns are arranged regularly and repeatedly in a lattice at a pitch of 10 to 30 μm, such that the phase difference between each of the projections and each of the recessions is set at $\pi$ radian against a light having a wavelength of 400 to 700 nm and such that the ratio in area of the total area of projections or recessions in one unit pattern relative to the area of said one unit pattern is set so as to fall within a range of 0.3 to 0.5, the improvement wherein the boundaries in each unit pattern, as defined between a projection and a recession adjacent to each other, are comprised of straight-lined portions and curved portions, and each of the unit patterns has a single projection being formed so as to have a hexagonal outer boundary and a circular inner boundary respectively defined relative to the outer and inner recessions adjacent thereto.

20. A bi-level focusing plate of a phase grating type having a number of unit patterns comprising:

a substrate having a first surface supporting the unit patterns which are repeatedly and adjacently arranged on said first surface of said substrate so as to be sectioned from each other by imaginary boundaries and at a pitch of 10 to 30 μm, each of said unit patterns includes phase difference means for providing a second surface which is parallel with and different in level from said first surface, the phase difference between the levels is set at $\pi$ radian for a light having a wavelength of 400 to 700 nm, the total area enclosed by the second surface in a unit pattern is set to fall into a range of 0.3 to 0.5, and the boundary extending between the first surface and the second surface has a margin configuration comprised of both straight-lined portions and curved portions, at least one curved margin portion configuration defining a circle and offset from a straight-lined margin portion.

* * * * *